(12) United States Patent
Okamoto

(10) Patent No.: US 8,931,517 B2
(45) Date of Patent: Jan. 13, 2015

(54) SOLENOID VALVE

(75) Inventor: Eiji Okamoto, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 377 days.

(21) Appl. No.: 13/503,996

(22) PCT Filed: Feb. 23, 2011

(86) PCT No.: PCT/JP2011/054012
§ 371 (c)(1),
(2), (4) Date: Apr. 25, 2012

(87) PCT Pub. No.: WO2011/108423
PCT Pub. Date: Sep. 9, 2011

(65) Prior Publication Data
US 2012/0211686 A1   Aug. 23, 2012

(30) Foreign Application Priority Data

Mar. 3, 2010 (JP) ................................. 2010-046395

(51) Int. Cl.
*F16K 11/07* (2006.01)
*F16K 31/06* (2006.01)
(52) U.S. Cl.
CPC .................................. *F16K 31/0624* (2013.01)
USPC ............... 137/625.68; 137/596.17; 137/627.5
(58) Field of Classification Search
USPC ............... 137/596.1, 596.17, 625.65, 625.68, 137/627.5, 625.69; 303/118.1, 119.2
See application file for complete search history.

(56) References Cited

U.S. PATENT DOCUMENTS

| | | | |
|---|---|---|---|
| 3,016,917 A | 1/1962 | Hunt | |
| 5,123,718 A * | 6/1992 | Tyler | 303/118.1 |
| 8,413,685 B2 * | 4/2013 | Okamoto | 137/596.17 |
| 8,434,517 B2 * | 5/2013 | Okamoto | 137/625.68 |
| 8,434,518 B2 * | 5/2013 | Okamoto | 137/596.17 |
| 2004/0118463 A1 | 6/2004 | Yamamoto | |

FOREIGN PATENT DOCUMENTS

| | | |
|---|---|---|
| EP | 2180218 A1 | 4/2010 |
| JP | S64-36777 U | 3/1989 |
| JP | 2009-287613 A | 12/2009 |
| WO | 2009/025366 A1 | 2/2009 |

OTHER PUBLICATIONS

International Search Report for JP2011/054012, ISA/JP, mailed Apr. 12, 2011.

* cited by examiner

*Primary Examiner* — John Rivell
*Assistant Examiner* — Craig J Price
(74) *Attorney, Agent, or Firm* — Harness, Dickey & Pierce, PLC

(57) ABSTRACT

The present invention provides a solenoid valve able to control flow amount as desired without receiving influence of change in fluid pressure. In the present invention, in a control valve for opening and closing a first poppet valve 103 and a second poppet valve 104 by a solenoid portion, a first pressure receiving area S1 which is a seating area of the first poppet valve 103, a second pressure receiving area S2 which is a seating area of the second poppet valve 104, a third pressure receiving area S3 which is a pressure receiving area of a first pressure sensing portion 145 and a fourth pressure receiving area S4 which is a pressure receiving area of a second pressure sensing portion 155 are made approximately equal to each other. Thereby unbalanced forces received from fluid flowing in and out when each poppet valve is actuated are all canceled.

2 Claims, 6 Drawing Sheets

SOLENOID VALVE

CROSS-REFERENCE TO RELATED APPLICATIONS

This application is a 371 U.S. National Stage of International Application No. PCT/JP2011/054012, filed Feb. 23, 2011. This application claims the benefit of Japanese Patent Application No. JP 2010-046395, filed Mar. 3, 2010. The disclosures of the above applications are incorporated by reference herein.

TECHNICAL FIELD

The present invention relates to a solenoid valve used for, for example, hydraulic control and the like of an automatic transmission.

BACKGROUND ART

A spool valve type solenoid valve is widely used, wherein a spool is slidably set up along an inner circumferential surface of a sleeve in which a port is formed on a side face thereof and a position of the spool is controlled by an electromagnetic force by solenoid and a mechanical force of a spring and the like; and the pressure of working fluid is controlled thereby. In this type of solenoid valves, it is necessary to provide clearance between the sleeve and the spool, so that it is difficult to completely prevent leakage between these two. As a method for reducing the leakage, the following solutions can be considered such that a length of a sliding portion is made longer, or such that clearance is made very small, which require highly accurate processing to result in growing processing cost.

As a solution showing good sealing characteristics for solving the above problem, for example, a solenoid valve, in which a poppet valve disclosed in Japanese Patent No 3994871 (Patent Document 1) and PCT International Publication No. WO2009/025366 (Patent Document 2) is used, is known.

A pressure proportional control valve disclosed in Japanese Patent No 3994871 has a first poppet valve mounted on a divider fixedly set up in a communication chamber formed between an input port and an output port and a second poppet valve arranged at a side opposite to an input port communicating side of the communication chamber communicating to the output port, wherein fluid pressure can be controlled proportionally with respect to output of the solenoid by making a seal sliding diameter of an inner circumference bore of the divider (a seal sliding diameter of a valve body of the first poppet valve, a first seal sliding diameter), a seating diameter of a valve portion of the first poppet valve and a seating diameter of the second poppet valve (abutting diameter) equally.

Also, a control valve disclosed in PCT International Publication No. WO2009/025366 has a structure, in which a valve portion of a first poppet valve and a valve portion of a second poppet valve are integrally formed as a valve portion body; this valve portion body is supported by a first pressure-sensing spring device constituted by bellows; and a valve seating body of the second poppet valve is supported by a second pressure-sensing spring device constituted by bellows, wherein a pressure receiving area of the first pressure-sensing spring device, a pressure receiving area of the second pressure-sensing spring device, a seating diameter of the valve portion of the first poppet valve and a seating diameter of the valve portion of the second poppet valve are made approximately equal to each other to result in good control characteristics.

[Patent Document 1] Japanese Patent No 3994871
[Patent Document 2] PCT International Publication No. WO2009/025366

DISCLOSURE OF INVENTION

Problems to be Solved by the Invention

However, for example, in the solenoid valve disclosed in Japanese Patent No 3994871, a seal sliding diameter of a valve seating body of the second poppet valve (second seal sliding diameter) is set up to be larger than these equally formed seal sliding surface diameter of the valve body of the inner circumference bore of the divider, seating diameter of the valve portion of the first poppet valve and seating diameter (abutting diameter) of the second poppet valve. As a result, the second poppet valve receives an influence of output pressure, so that an opening amount may not be controlled only by a force of the solenoid.

Also, in the control valve disclosed in PCT International Publication No. WO2009/025366, because of the use of bellows, there is a problem to grow component cost.

Furthermore, in the control valve, it is necessary to increase pressure resistance of the bellows and to increase board thickness of the bellows when forming the solenoid valve resistible to high pressure. This causes a problem that the whole solenoid has to be made larger because spring constant of the bellows is increased.

Also, in the control valve in which the bellows are used, it may be impossible to appropriately open and close a valve when a slope of the valve at seating caused by a slope of the bellows cannot be corrected.

The present invention has been made in view of these problems, and the purpose is to provide a small-size solenoid valve with high pressure resistance, able to control flow amount reliably and highly accurately and able to reduce cost.

Means for Solving the Problems

In order to solve the above problems, in the present invention according to claim 1, there is provided a solenoid valve for controlling flow amount of fluid comprising: a body inside of which is formed into a valve space chamber penetrating in axial direction, the valve space chamber being divided in axial direction in sequence into a first pressure-sensing chamber, a first valve chamber, a second valve chamber and a second pressure-sensing chamber by a first partition portion formed to have an inner circumference diameter smaller than its surrounding, a second partition portion and a third partition portion; a supply port penetrating the first valve chamber of the body and flowing fluid in and out with desired supply pressure with respect to outside of the body; an output port penetrating the second valve chamber of the body and flowing fluid in and out with desired control pressure with respect to outside of the body; a discharging port respectively penetrating one or both of the first pressure-sensing chamber and second pressure-sensing chamber of the body and flowing fluid in and out with desired discharging pressure with respect to outside of the body; a first valve member movably arranged in axial direction inside the first pressure-sensing chamber, the first valve chamber and the second valve chamber of the body, the member having a first communication passage therein for penetrating the member in axial direction and communicating a first pressure-sensing chamber side and a second valve chamber side; a second valve member movably arranged in axial direction inside the second valve chamber and the second pressure-sensing chamber, the member having a second communication passage therein for penetrating the member in axial direction and communicating a second valve chamber side and the second pressure-sensing chamber side; a first poppet valve having any one of a valve body and a valve seating body formed on the second partition portion dividing the first valve chamber and the second valve chamber, and the other one of the valve body and valve seating body formed on the first valve member, the first poppet valve for opening and closing between the first valve chamber for flowing fluid via the supply port and the second valve chamber for flowing fluid via the output port; a second poppet valve having any one of a valve body and a valve seating body formed on an end portion at a second valve chamber side of the first valve member and formed in the second valve chamber, and the other one of the valve body and valve seating body formed on an end portion at a second valve chamber side of the second valve member and formed in the second valve chamber, the second poppet valve for communicating the first communication passage and the second communication passage with the second valve chamber when opening the valve and communicating the first communication passage with the second communication passage when closing the valve; a first pressure sensing portion integrally formed with the first valve member, and slidably arranged on an inner circumference of the first partition portion dividing the first pressure-sensing chamber and the first valve chamber; a second pressure sensing portion integrally formed with the second valve member, and slidably arranged on an inner circumference of the third partition portion dividing the second valve chamber and the second pressure-sensing chamber; a solenoid portion generating magnetic force in predetermined direction depending on applied electric current and making the magnetic force act on the second valve member via a solenoid rod connected to the second valve member; a first spring arranged between the body and the first valve member and making elastic force act on the first valve member in second valve member direction; and a second spring arranged between the body and the second valve member and making elastic force act on the second valve member in opposite direction to the magnetic force acted upon by the solenoid portion; wherein a first pressure receiving area which is a seating area of the first poppet valve, a second pressure receiving area which is a seating area of the second poppet valve, a third pressure receiving area which is a pressure receiving area of the first pressure sensing portion and a fourth pressure receiving area which is a pressure receiving area of the second pressure sensing portion are nearly equally made.

By the control valve having such constitution, since the first pressure receiving area of an internal diameter surface where a first valve seating surface and a first valve portion surface are joined, the second pressure receiving area of an internal diameter surface where a second valve seating surface and a second valve portion surface are joined, the third pressure receiving area of the first pressure sensing portion and the fourth pressure receiving area of the second pressure sensing portion are nearly equally made, unbalanced force received from pressure fluid flowing in when each poppet valve actuates is all canceled. Namely, even when fluid with fluctuating pressure generated by a squeeze pump and the like flows in the first valve chamber, the fluctuating pressure of this fluid can be received by almost same pressure receiving areas, so that the received force is same to cancel conflicting forces. Even when the fluctuating pressure acts on the first poppet valve and the second poppet valve, opening level of the first poppet valve and second poppet valve can be controlled by the solenoid rod moving due to the solenoid portion depending on spring force of the spring and magnitude of electric current, so that flow amount can reliably be controlled.

Also, in the solenoid valve of the present invention according to claim 2, a seal member such as O ring is fixedly set up on any one or both of the inner circumference of the partition portion and outer circumference of the first pressure sensing portion or the second pressure sensing portion which slides with the inner circumference in at least any one of the first partition portion and the third partition portion.

In the solenoid valve having such constitution, fluid leakage from the slide member can be reduced, and flow amount can more appropriately controlled.

BEST MODE FOR CARRYING OUT THE INVENTION

First Embodiment

The first embodiment of the present invention will be explained in reference to FIG. 1.

In the present embodiment, basic constitution of a normal close-type solenoid valve according to the present invention will be explained in reference to FIG. 1. The solenoid valve of the present embodiment can be used for hydraulic brake and the like of automatic transmission, for example.

Figure 1:
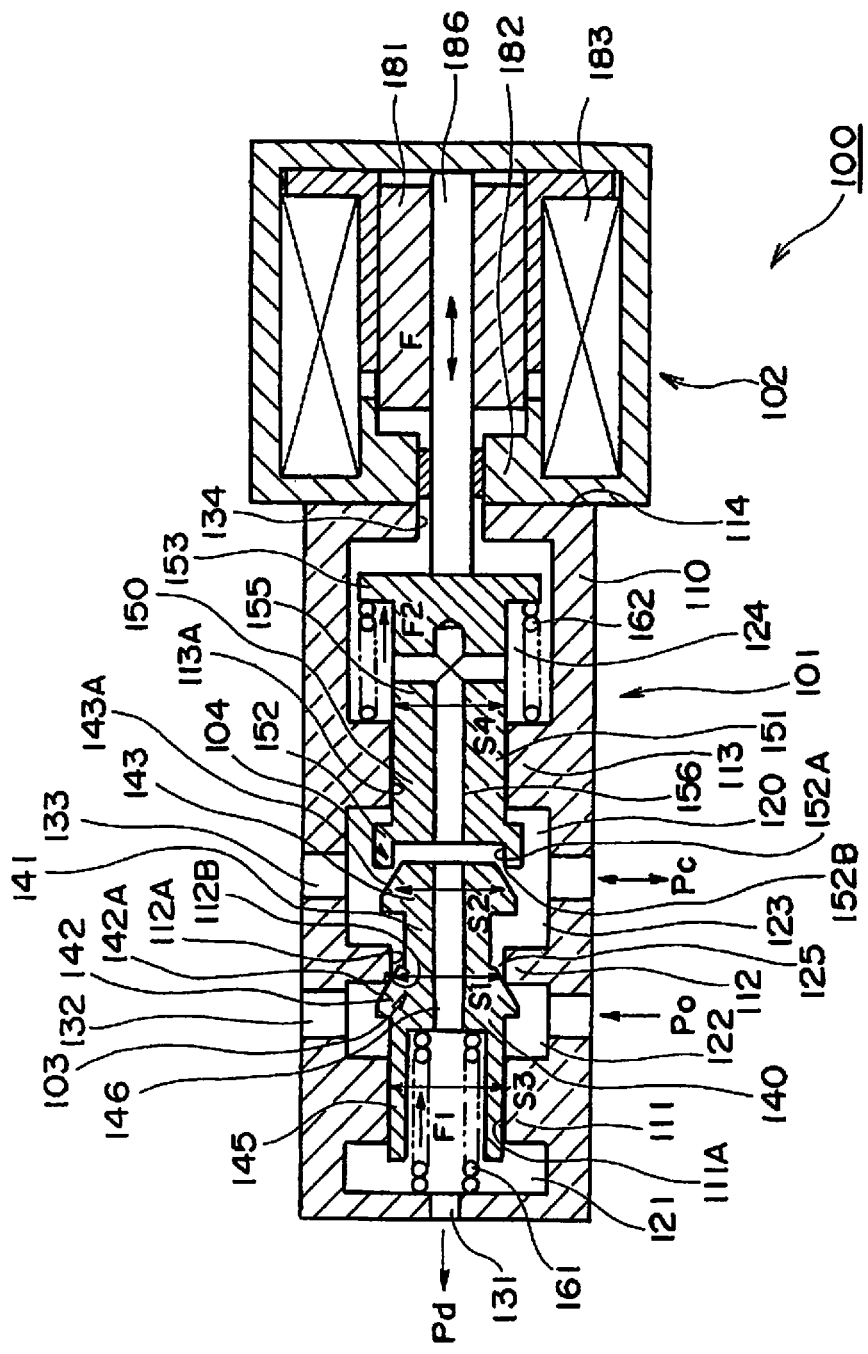
FIG. 1 is a figure showing constitution of a solenoid valve of a first embodiment of the present invention.

FIG. 1 is a cross-sectional view of a solenoid valve 100 according to the present invention.

As shown in FIG. 1, the solenoid valve 100 is obtained by integrally forming a control valve portion 101 and a solenoid portion 102.

The control valve portion 101 has a body 110 as an outer frame and a valve space chamber 120 penetrating inside the body 110 in axial direction. The valve space chamber 120 is divided by a first to third partition portions 111 to 113 to separate into a first pressure-sensing chamber 121, a first valve chamber 122, a second valve chamber 123 and a second pressure-sensing chamber 124.

Note that the body 110 can be made of metal such as iron, brass, copper, aluminum and stainless steel, and synthetic resin material such as industrial plastics and special type of plastics, etc.

A discharging port 131 penetrating in axial direction from the first pressure-sensing chamber 121 to outside, a supply port 132 penetrating from an outer circumferential surface to the first valve chamber 122, and an output port 133 penetrating from the outer circumferential surface to the second valve chamber 123 are formed on the body 110. Pluralities of the supply ports 132 and the output ports 133 are provided along the outer circumferential surface. Fluid with supply pressure Po flows into the supply port 132, fluid with control pressure Pc flows out of or in the output port 133, and fluid with discharging pressure Pd is discharged from the discharging port 131.

External surface of an end portion at a solenoid portion 102 side of the body 110 is formed into a mounting surface 114 where the solenoid portion 102 is mounted, and its end portion, i.e. an end portion at a solenoid portion 102 side of the second pressure-sensing chamber 124, is provided with a penetrate bore 134 for a solenoid rod 186 penetrating the end portion in axial direction.

A surrounding surface of a bore of the first partition portion 111 of the body 110 communicating between the first pressure-sensing chamber 121 and the first valve chamber 122 is formed into a first sliding surface 111A. In the first sliding surface 111A, an outer circumferential surface of a first pressure sensing portion 145 having cylindrical constitution of the after-mentioned valve body 140 is penetrated with minimal clearance, which allows the surfaces to slide in axial direction.

A valve bore surface 112A is formed on a surrounding surface of a bore of the second partition portion 112 communicating between the first valve chamber 122 and the second valve chamber 123, and a first valve seating surface 112B constituting a first poppet valve 103 is formed on an end portion at a first valve chamber 122 side of the valve bore surface 112A.

A surrounding surface of a bore of the third partition portion 113 communicating between the second valve chamber 123 and the second pressure-sensing chamber 124 is formed into a second sliding surface 113A. In the second sliding surface 113A, an outer circumferential surface of a circular cylindrical shaped fuselage component 151 of the after-mentioned valve seating body 150 is penetrated with minimal clearance, which allows the surfaces to slide in axial direction.

The valve body 140 (corresponding to the first valve member in claims) is a member wherein a cylindrical first pressure sensing portion 145 and a first valve body 142 are formed in one end portion of a circular cylindrical fuselage component 141, and a second valve body 143 is formed in the other end portion. In other words, the valve body 140 is a member wherein the first valve body 142, the second valve body 143 and the first pressure sensing portion 145 are integrated. The valve body 140 is arranged inside the valve space chamber 120 of the body 110 of the control valve portion 101 in a constitution such that its end portion at a second valve body 143 side is positioned at a solenoid portion 102 side, and that the second partition portion 112 intervenes between the first valve body 142 and the second valve body 143.

Note that the valve body 140 is, for example, assembled by making an outer circumferential surface of the end portion of the fuselage component 141 fit into and connect to a fit bore provided on an end portion of the first valve portion 142, and is arranged into the above constitution.

Materials of the valve body 140 are, for example, metal such as brass, copper, aluminum and stainless steel, or synthetic resin material, etc.

In the valve body 140, the first valve body 142 is arranged inside the first valve chamber 122. A first valve portion surface 142A is formed on the first valve body 142, which is a tapered surface reduced in diameter toward the fuselage component 141, i.e. reduced in diameter toward the second partition portion 112 of the body 110. The first valve portion surface 142A is joined to the first valve seating surface 112B to close the valve when the valve body 140 moves toward solenoid portion 102 direction and the tapered surface moves in the valve bore surface 112A. Also, when the valve body 140 moves away from the solenoid portion 102 and the tapered surface is away from the first valve seating surface 112B, the valve is opened.

Thus, the first valve portion surface 142A and the first valve seating surface 112B are formed into the first poppet valve 103 where cylindrical surfaces are not fitted. In the poppet valve, the valve seating surface is contacted with (seated on) the valve portion surface with minimal width, so that it is possible not to involve sliding friction when opening and closing the valve.

Note that a cross-sectional surface (seating area) of an inner diameter portion where the first valve portion surface 142A and the first valve seating surface 112B are joined (seated) is a first pressure receiving area S1 for receiving pressure of working fluid.

The fuselage component 141 of the valve body 140 is arranged to freely fit to an inside of the valve bore surface 112A of the second partition portion 112 of the body 110. When the first valve portion surface 142A is away from the first valve seating surface 112B to open the first poppet valve 103, a first flow passage 125 is formed between the fuselage component 141 of the valve body 140 and the valve bore surface 112A. Therefore, when the first poppet valve 103 is opened, fluid with supply pressure Po flows from the first valve chamber 122 via the first flow passage 125 and is supplied into the second valve chamber 123.

Thus, since the fuselage component 141 of the valve body 140 is arranged to freely fit to the inside of the valve bore surface 112A of the second partition portion 112 of the body 110, a space exists between the fuselage component 141 and the valve bore surface 112A not to contact with each other even when the valve body 140 moves. Consequently, even when any attachment is adhered to the fuselage component 141, there is no defect in actuation of the solenoid valve 100 because the fuselage component 141 and the valve bore surface 112A do not slide.

In the valve body 140, the second valve body 143 is arranged inside the second valve chamber 123. The second valve body 143 is formed on an end portion at a solenoid portion 102 side of the valve body 140. A second valve portion surface 143A is formed on the second valve body 143, which is a tapered surface reduced in diameter toward an anterior end, i.e. reduced in diameter toward the after-mentioned valve seating body 150. The second valve portion surface 143A is joined to a second valve seating surface 152B to close the valve when the valve seating body 150 moves toward the valve body 140, and the tapered surface of the second valve body 143 is positioned in a cylindrically-shaped valve bore surface 152A of a valve seat 152 formed on an end portion at a valve body 140 side of the valve seating body 150. Also, when the valve seating body 150 moves away from the valve body 140 and the tapered surface is away from the second valve seating surface 152B, the valve is opened.

Thus, the second valve portion surface 143A and the second valve seating surface 152B are formed into a second poppet valve 104 where cylindrical surfaces are not fitted. As with the first poppet valve 103, in the second poppet valve 104, the valve portion surface is contacted with (seated on) the valve seating surface with minimal width, so that it is possible not to involve sliding friction when opening and closing the valve.

Note that a cross-sectional surface (seating area) of an inner diameter portion where the second valve portion surface 143A and the second valve seating surface 152B are joined (seated) is a second pressure receiving area S2 for receiving pressure of working fluid.

Also, a first communication passage 146 is formed inside the valve body 140, which penetrates from the first pressure sensing portion 145 to the second valve body 143.

In the valve body 140, the first pressure sensing portion 145 is arranged on an end portion opposite to the solenoid portion 102. The first pressure sensing portion 145 is a cylindrically-shaped portion having a bottom whose end portion side is opened to the first pressure-sensing chamber 121, and its outer circumferential surface is slidably fitted in axial direction to the first sliding surface 111A of the first partition portion 111 of the body 110. On the surface at a first valve body 142 side, i.e. the bottom of the cylindrically-shaped first pressure sensing portion 145, an opening of end portion of the first communication passage 146 is formed, which penetrates to the second valve body 143.

A first spring 161 is arranged on an inner circumference portion of the cylindrically-shaped first pressure sensing portion 145. One end portion of the first spring 161 is connected to the bottom of the cylindrically-shaped first pressure sensing portion 145, and the other end portion of the first spring 161 is connected to an end face where the discharging port 131 of the first pressure-sensing chamber 121 is formed. The first spring 161 elastically presses the valve body 140 by spring force F1 in solenoid portion 102 direction.

The first pressure-sensing chamber 121 is communicated with the second valve chamber 123 via the first communication passage 146 when the second valve portion surface 143A of the second valve body 143 of the valve body 140 is away from the second valve seating surface 152B of the valve seating body 150 to open valve. Also, the first pressure-sensing chamber 121 is communicated with the second pressure-sensing chamber 124 via the first communication passage 146 and a second communication passage 156 when the second valve portion surface 143A of the second valve body 143 is in close contact with the second valve seating surface 152B of the valve seating body 150 to close valve.

Note that an area where the first pressure sensing portion 145 receives supply pressure Po is a third pressure receiving area S3.

The valve seating body 150 is set up movably in axial direction at the solenoid portion 102 side of the valve body 140 inside the body 110.

In the valve seating body 150 (corresponding to the second valve member in claims), the cylindrical valve seat 152 is formed on an end portion at a valve body 140 side of the circular cylindrical fuselage component 151, and a second pressure sensing portion 155 is formed at a solenoid portion 102 side of the fuselage component 151. Also, an end portion of the solenoid rod 186 is connected to an end portion at further solenoid portion 102 side of the valve seating body 150. Also, a flange portion 153 is formed on the end portion at the solenoid portion 102 side of the valve seating body 150 in outer diameter direction, and a second spring 162 is arranged between the flange portion 153 and a circular side face at a solenoid portion 102 side of the third partition portion 113. The second spring 162 is an extension spring biasing the solenoid rod 186 toward right side in the drawings, i.e. solenoid portion 102 side.

Note that a pressure receiving area of the second pressure sensing portion 155 is the fourth pressure receiving area S4.

The second valve seating surface 152B provided at an inner circumference corner of an end portion at a valve body 140 side of the valve seat 152 of the valve seating body 150 forms an open and closed valve by joining to and separating from the second valve portion surface 143A of the second valve body 143 of the valve body 140. As mentioned above, the second valve seating surface 152B and the second valve portion surface 143A constitute the second poppet valve 104 which is opened and closed by joining these surfaces with a small joining width. Also, an area for receiving fluid with control pressure Pc in the cross-sectional surface of the inner diameter portion where the second valve seating surface 152B and the second valve portion surface 143A are joined is the second pressure receiving area S2.

In the present embodiment, the above-mentioned first pressure receiving area (seating area of the first poppet valve 103) S1, second pressure receiving area (seating area of the second poppet valve 104) S2, third pressure receiving area (pressure receiving area of the first pressure sensing portion 145) S3 and fourth pressure receiving area (pressure receiving area of the second pressure sensing portion 155) S4 are all formed approximately equally. Note that "approximately equal" means being within ±6% which allows attaining approximately same function effect.

Also, the second communication passage 156 for communicating between the bottom of the circular cylindrical valve seat 152 and the second pressure-sensing chamber 124 is formed on the valve seating body 150. The second communication passage 156 allows introducing fluid in the second valve chamber 123 to the second pressure-sensing chamber 124 where the second spring 162 is arranged when the second poppet valve 104 is opened. Simultaneously, the second communication passage 156 always communicates between the second pressure-sensing chamber 124 and the first communication passage 146, and between the first pressure-sensing chamber 121 and the discharging port 131.

Fluid flowing into the second pressure-sensing chamber 124 acts on each member inside the solenoid portion 102 communicating therewith, and allows balancing pressure of the fluid in order to avoid the pressure from acting on only one surface (fluid also flows into the solenoid portion 102 from the second pressure-sensing chamber 124).

By the valve seating body 150 having such constitution, the valve seating body 150 is separated from the valve body 140 to open the second poppet valve 104 by spring force F2 of the second spring 162 when the solenoid portion 102 does not actuate. When the second poppet valve 104 is opened, the second valve chamber 123 and the second pressure-sensing chamber 124 communicate via the second communication passage 156, so that fluid with control pressure Pc can be flowed from the second valve chamber 123 to the second pressure-sensing chamber 124.

The solenoid portion 102 is, as mentioned above, connected to the mounting surface 114 of the control valve portion 101.

The solenoid portion 102 is provided with a movable shaft 181 therein, and the solenoid rod 186 is linked with the movable shaft 181. Also, a fixed shaft 182 is provided at a position facing to the movable shaft 181, and a magnet coil 183 is arranged around the movable shaft 181 and the fixed shaft 182 to constitute electromagnetic circuit. When electric current is applied to the magnet coil 183, the movable shaft 181 is suctioned to the fixed shaft 182 by magnetic force F generated in the electromagnetic circuit depending on magnitude of electric current. When the movable shaft 181 is suctioned to the fixed shaft 182, the solenoid rod 186 integrated with the movable shaft 181 moves together with the movable shaft 181 to compress the second spring 162 and to press the valve seating body 150. When the valve seating body 150 moves, the valve seating body 150 closes valve with respect to the valve body 140, and moves the valve body 140 to the left side in the drawings to separate the first valve portion surface 142A from the first valve seating surface 112B to open the first poppet valve 103. At the time, the first spring 161 is also compressed.

Next, movements of the solenoid valve 100 having such constitution will be explained.

First, when electric current is not applied to the solenoid portion 102, magnetic force F is not acted between the movable shaft 181 and the fixed shaft 182 of the solenoid portion 102; the movable shaft 181 and the fixed shaft 182 are separated; and the valve seating body 150 is pushed toward the solenoid portion 102 by extension force of the spring force F2 of the second spring 162. As a result, the second valve seating surface 152B of the valve seat 152 is separated from the second valve portion surface 143A of the valve body 140, so that the second poppet valve 104 is opened with maximum stroke (opening amount).

When the second poppet valve 104 is opened, the fluid can be flowed from the second valve chamber 123 to the first communication passage 146, and fluid with control pressure Pc is discharged from the second valve chamber 123 to the discharging port 131 through the first communication passage 146 and first pressure-sensing chamber 121 to reduce the control pressure Pc. Namely, when electric current to the solenoid portion 102 is stopped, the control pressure Pc is reduced.

Also, when the second poppet valve 104 is opened, the second pressure-sensing chamber 124 communicates with the second valve chamber 123 via the second communication passage 156, so that the second pressure-sensing chamber 124, the second valve chamber 123 and the first pressure-sensing chamber 121 are kept under the same pressure.

Also, when the second poppet valve 104 is opened, the valve body 140 is pressed by the spring force F1 of the first spring 161 arranged in the first pressure-sensing chamber 121, so that the first valve portion surface 142A is joined to the first valve seating surface 112B. Namely, the first poppet valve 103 composed of the first valve portion surface 142A and the first valve seating surface 112B is closed with stroke (opening amount) of zero. Consequently, the fluid with supply pressure Po supplied from the supply port 132 is blocked by the first poppet valve 103 to stop the fluid from flowing into the second valve chamber 123.

Note that, as mentioned above, the first pressure receiving area S1, the second pressure receiving area S2, the third pressure receiving area S3 and the fourth pressure receiving area S4 are all formed to have an equal area in the solenoid valve 100 of the present embodiment, so that mutual forces received from the working fluid can be canceled.

When electric current is applied to the solenoid portion 102 in such a state, the magnetic force F is acted between the movable shaft 181 and the fixed shaft 182 of the solenoid portion 102 to make the movable shaft 181 and the fixed shaft 182 come close, and the valve seating body 150 moves against the extension force of the spring force F2 of the second spring 162 to the position away from the solenoid portion 102 side. As a result, the second valve seating surface 152B of the valve seat 152 is close to the second valve portion surface 143A to decrease the stroke (opening amount) of the second poppet valve 104.

The magnetic force F, the length between the movable shaft 181 and the fixed shaft 182, the position where the valve seating body 150 moves and stroke (opening amount) of the second poppet valve 104 in the above state can be determined by the amount of current applied to the solenoid portion 102. Namely, when the amount of current applied to the solenoid portion 102 is larger, magnetic force F acted between the movable shaft 181 and the fixed shaft 182 of the solenoid portion 102 is increased to make the movable shaft 181 and the fixed shaft 182 come close, the valve seating body 150 moves to the position further away from the solenoid portion 102 side, and the stroke (opening amount) of the second poppet valve 104 is further decreased. As a result, flow of the fluid between the second valve chamber 123 and the first communication passage 146 is further suppressed.

When the amount of current applied to the solenoid portion 102 reaches a certain level, the valve seating body 150 moves to the position where the second valve seating surface 152B is joined to the second valve portion surface 143A of the valve body 140, the stroke (opening amount) of the second poppet valve 104 becomes zero, and the second poppet valve 104 is closed. In this state, flow of the fluid from the second valve chamber 123 to the first communication passage 146 is blocked, and the fluid with control pressure Pc flowing through the output port 133 is stopped from flowing toward the discharging port 131.

Note that in this state, i.e. in the state that the valve seating body 150 simply moves to the position where the second valve seating surface 152B is joined to the second valve portion surface 143A, the first poppet valve 103 is still closed with stroke (opening amount) of zero, so that both the first poppet valve 103 and the second poppet valve 104 are closed.

When the amount of current applied to the solenoid portion 102 is further increased, the valve body 140 integrated with the valve seating body 150 by joining the second valve portion surface 143A to the second valve seating surface 152B of the valve seat 152 is moved toward the first pressure-sensing chamber 121 against the spring force F1 of the first spring 161 of the first pressure-sensing chamber 121, and the first valve portion surface 142A of the first poppet valve 103 is separated from the first valve seating surface 112B.

As a result, the fluid with supply pressure Po supplied from the supply port 132 starts flowing through the first flow passage 125 between the first valve seating surface 112B and the first valve portion surface 142A and then flowing into the second valve chamber 123, so that the amount of flow with control pressure Pc is increased at an output port 133 side.

The stroke (opening amount) of the first poppet valve 103 at this time is also determined by the amount of current applied to the solenoid portion 102. Namely, when the amount of current applied to the solenoid portion 102 is larger, the distance that the valve body 140 moves toward the first pressure-sensing chamber 121 against the spring force F1 of the first spring 161 is increased, the length between the first valve portion surface 142A and first valve seating surface 112B of the first poppet valve 103 is increased, and the stroke (opening amount) of the first poppet valve 103 becomes larger.

When a maximum electric current is applied to the solenoid portion 102, the maximum magnetic force F acts between the movable shaft 181 and the fixed shaft 182 to make the movable shaft 181 and the fixed shaft 182 be maximally close to each other. As the solenoid rod 186 connected to the movable shaft 181 compresses the second spring 162 of the second pressure-sensing chamber 124 and the first spring 161 of the first pressure-sensing chamber 121, it allows integrally moving the valve seating body 150 and the valve body 140 toward the pressure-sensing chamber 121.

In this state, the second valve seating surface 152B is joined to the second valve portion surface 143A to close the second poppet valve 104 as mentioned above, so that flow of fluid between the second valve chamber 123 and the first communication passage 146 is blocked, and the fluid with control pressure Pc which flows in the output port 133 is stopped flowing out toward the discharging port 131.

On the other hand, the first poppet valve 103 is opened, and the fluid with supply pressure Po supplied from the supply port 132 flows through the first flow passage 125 between the first valve seating surface 112B and the first valve portion surface 142A into the second valve chamber 123. As a result, flow amount with control pressure Pc at an output port 133 side (e.g. fluid of hydraulic brake) can be increased.

Thus, when the second poppet valve 104 is closed, the valve body 140 moves depending on the controlled electric current flowed into the solenoid portion 102, and the first poppet valve 103 actuates for opening and closing. At this point, in the solenoid valve 100, the first pressure receiving area S1, the second pressure receiving area S2, the third pressure receiving area S3 and the fourth pressure receiving area S4 are approximately equal to each other, so that unbalanced force due to fluctuating pressure from the fluid with supply pressure Po is canceled. Even if the fluid with supply pressure Po supplied from a hydraulic pump is changed, it is possible to effectively prevent change in the valve body 140 by supply pressure Po, allowing the opening level of the first poppet valve 103 to open and close as set up depending on the stroke of the solenoid rod 186. Namely, the first poppet valve 103 is opened and closed only by movement of the solenoid rod 186 by the magnetic force F of the solenoid portion 102, and the force of the spring force F1 of the first spring 161 of the first pressure-sensing chamber 121 and the spring force F2 of the second spring 162 of the second pressure-sensing chamber 124, by which the flow amount of the fluid with control pressure Pc can be controlled.

Namely, the pressure receiving area S1 of the first valve body 142 (the first poppet valve 103), the pressure receiving area S2 of the second valve body 143 (the second poppet valve 104), the pressure receiving area S3 of the first pressure sensing portion and the pressure receiving area S4 of the second pressure sensing portion are respectively made to have the same area, so that the conflict force can be cancelled even when the fluids with pressures Po and Pc respectively act on these pressure receiving areas S1 to S4.

The movable shaft 181 controlled by the spring forces F1 and F2 of the first spring 161 and the second spring 162 and the magnetic force F of the solenoid portion 102 is moved by the desired distance because the distance between the movable shaft 181 and the fixed shaft 182 is controlled to result in controlling the solenoid rod 186 integrally formed with the movable shaft 181.

As a result, the second valve seating surface 152B of the valve seating body 150 connected to the solenoid rod 186 elastically elongates and contracts the first spring 161 and the second spring 162, and allows controlling the opening level of the first poppet valve 103 while it is joined to the second valve portion surface 143A of the valve body 140 to close the valve. Namely, the corresponding movement of the valve body 140 in this case allows controlling the opening level of the valve between the first valve seating surface 112B and the first valve portion surface 142A without being influenced by change in supply pressure Po. By thus-controlled opening and closing of the first poppet valve 103, it is possible to control the fluid with supply pressure Po flowing from the first valve chamber 122 to the second valve chamber 123 based on the flow amount proportion control.

Note that in the solenoid valve 100, the closing of the second poppet valve 104 and the opening of the first poppet valve 103, or the closing of the first poppet valve 103 and the opening of the second poppet valve 104 are not continuously switched to each other with respect to the amount of current applied to the solenoid portion 102.

Load required for driving the solenoid rod 186 is discontinuously increased or decreased depending on the change in movement of the valve seating body 150: when the second valve portion surface 143A of the valve body 140 is joined to the second valve seating surface 152B of the valve seating body 150 to integrally move the valve body 140 and the valve seating body 150 against the spring force F1 of the first spring 161 of the first pressure-sensing chamber 121 and the spring force F2 of the second spring 162 of the second pressure-sensing chamber 124, or when only the valve seating body 150 separated from the valve body 140 moves only against the spring force F2 of the second spring 162 of the second pressure-sensing chamber 124. Therefore, the magnitude of the magnetic force F required for the solenoid portion 102 to drive these bodies is also discontinuously changed.

Consequently, at the time of the above switching, i.e. when switching the state in which the first poppet valve 103 is closed and the second poppet valve 104 is opened to the other state in which the first poppet valve 103 is opened and the second poppet valve 104 is closed, the solenoid rod 186 does not move even when the amount of current applied to the solenoid portion 102 is changed, the first poppet valve 103 and the second poppet valve 104 are concurrently closed. Namely, the amount of current applied to the solenoid portion 102 is kept within the range of the predetermined amount of current to make both the first poppet valve 103 and the second poppet valve 104 be closed even when the amount of current is either increased or decreased.

Thus, the solenoid valve 100 of the present embodiment actuates the solenoid rod 186 of the solenoid portion 102 depending on the magnitude of electric current to control the opening/closing degrees (opening amounts) of the first poppet valve 103 and the second poppet valve 104 in cooperation with the spring forces F1 and F2 of the first and second springs 161 and 162, and to flow the fluid with control pressure Pc depending on the opening/closing degrees of the valves, so that the flow amount is controlled. Since the relation of S1=S2=S3=S4 is satisfied in the constitution to actuate the first poppet valve 103 and the second poppet valve 104 of the solenoid valve 100, there is no unbalance force acted on the first poppet valve 103 and the second poppet valve 104 due to fluid pressure. Therefore, it is possible to move the solenoid rod 186 only by the magnetic force F of the solenoid portion 102 as set up and to control the opening/closing degrees of the first poppet valve 103 and the second poppet valve 104.

Also, the solenoid valve 100 of the present embodiment is constituted so as to form no slide member between the fuselage component 141 of the valve body 140 and the valve bore surface 112A of the second partition portion 112, and also, the valve surfaces of the first poppet valve 103 and the second poppet valve 104 are contacted with narrow width in line contact. Consequently, in the first poppet valve 103 and the second poppet valve 104, frictional resistance can be reduced, and sliding surfaces are small, so that it is possible to reduce the possibility that any attachment is adhered between the sliding surfaces to increase sliding friction.

Also, by constituting the valve portion with the poppet valve, the amount of leakage can be reduced in each valve, resulting in reducing inside leakage in the valve as a whole.

Also, the valve body slides with minimal clearance without using bellows in the solenoid valve 100 of the present embodiment. Consequently, it is possible to prevent from causing a slope due to the slope of the bellows when the valve is seated, so that the valve can be properly opened and closed.

Also, compared to a solenoid valve with using bellows, a solenoid valve resistible to high pressure can be constituted.

In other words, while the solenoid valve is kept small in size, the flow amount can be secured.

Also, it is possible to reduce component cost and to downsize the device.

Second Embodiment

The second embodiment of the present invention will be explained in reference to FIG. 2.

In the present embodiment, basic constitution of a normal open-type solenoid valve according to the present invention will be explained in reference to FIG. 2. The solenoid valve of the present embodiment, as with the first embodiment, can be used for hydraulic brake and the like of automatic transmission, for example.

Figure 2:
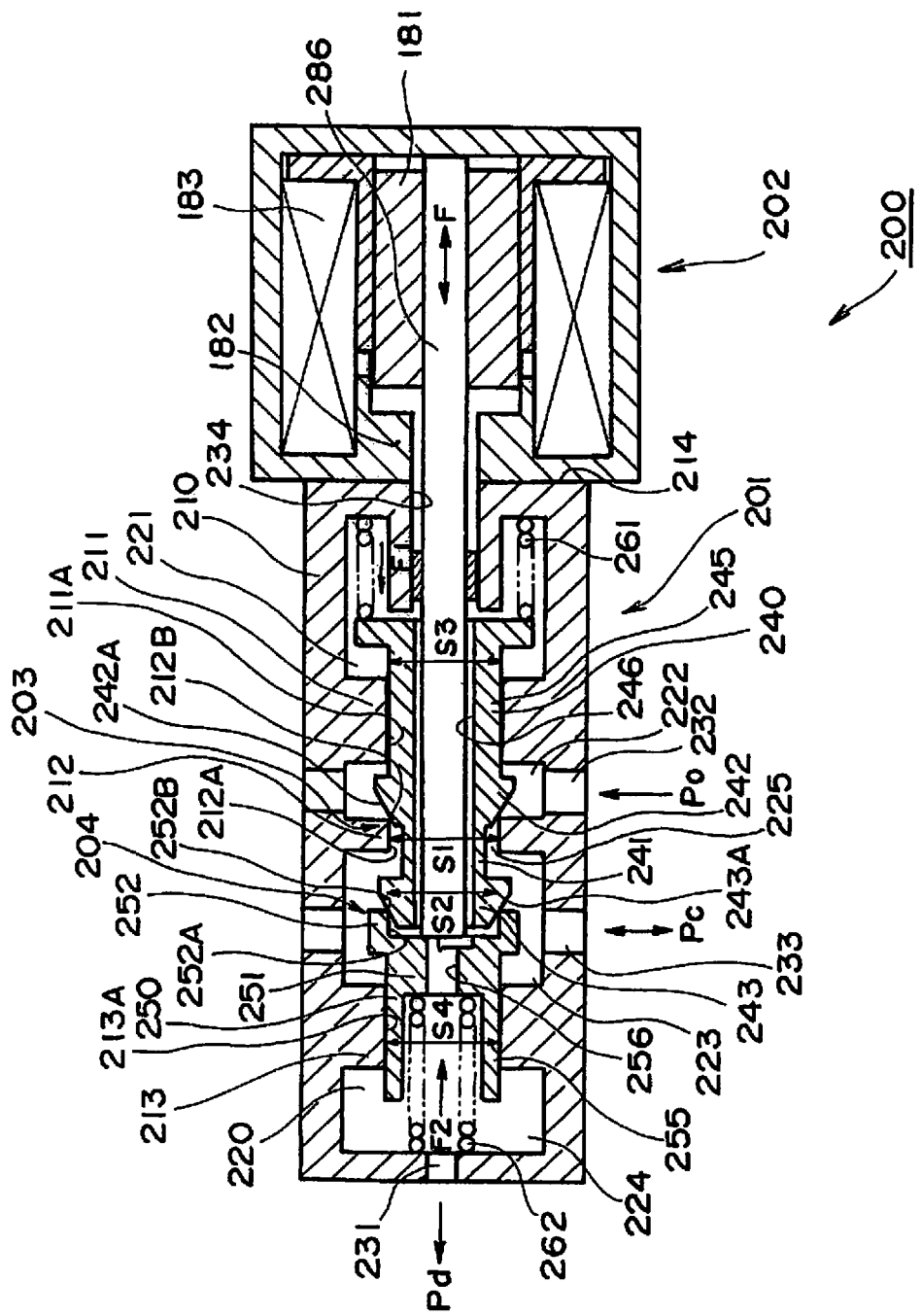
FIG. 2 is a figure showing constitution of a solenoid valve of a second embodiment of the present invention.

FIG. 2 is a cross-sectional view of a solenoid valve 200 according to the present invention.

As shown in FIG. 2, the solenoid valve 200 is obtained by integrally forming a control valve portion 201 and a solenoid portion 202.

The control valve portion 201 has a body 210 as an outer frame, and a valve space chamber 220 penetrating inside the body 210 in axial direction. The valve space chamber 220 is divided by a first to third partition portions 211 to 213 to separate into a first pressure-sensing chamber 221, a first valve chamber 222, a second valve chamber 223 and a second pressure-sensing chamber 224.

Note that the body 210 can be made of metal such as iron, brass, copper, aluminum and stainless steel, and synthetic resin material such as industrial plastics and special type of plastics, etc.

On the body 210, a discharging port 231 penetrating in axial direction from the second pressure-sensing chamber 224 to outside, a supply port 232 penetrating from the outer circumferential surface to the first valve chamber 222, and an output port 233 penetrating from the outer circumferential surface to the second valve chamber 223 are &allied. Pluralities of the supply ports 232 and the output ports 233 are provided along the outer circumferential surface. Fluid with supply pressure Po flows into the supply port 232, fluid with control pressure Pc flows out of or in the output port 233, and fluid with discharging pressure Pd is discharged from the discharging port 231.

External surface of an end portion at a solenoid portion 202 side of the body 210 is formed into a mounting surface 214 where the solenoid portion 202 is mounted, and its end portion, i.e. an end portion at a solenoid portion 202 side of the first pressure-sensing chamber 221, is provided with a penetrate bore 234 for a solenoid rod 286 penetrating the end portion in axial direction.

A surrounding surface of a bore of the first partition portion 211 of the body 210 communicating the first pressure-sensing chamber 221 and the first valve chamber 222 is formed into a first sliding surface 211A. In the first sliding surface 211A, an outer circumferential surface of a first pressure sensing portion 245 having cylindrically constitution of the after-mentioned valve body 240 is penetrated with minimal clearance, which allows the surfaces to slide in axial direction.

A valve bore surface 212A is formed on a surrounding surface of a bore of the second partition portion 212 communicating between the first valve chamber 222 and the second valve chamber 223, and a first valve seating surface 212B constituting the first poppet valve 203 is formed on an end portion at a first valve chamber 222 side of the valve bore surface 212A.

A surrounding surface of a bore of the third partition portion 213 communicating between the second valve chamber 223 and the second pressure-sensing chamber 224 is formed into a second sliding surface 213A. In the second sliding surface 213A, outer circumferential surfaces of a circular cylindrical shaped fuselage component 251 and second pressure sensing portion 255 of the after-mentioned valve seating body 250 are penetrated with minimal clearance, which allows the surfaces to slide in axial direction.

The valve body 240 (corresponding to the first valve member in claims) is a member wherein a cylindrical first pressure sensing portion 245 and a first valve body 242 are formed in one end portion of a circular cylindrical fuselage component 241, and a second valve body 243 is formed in the other end portion. In other words, the valve body 240 is formed by integrating the first valve body 242, the second valve body 243 and the first pressure sensing portion 245. The valve body 240 is arranged inside the valve space chamber 220 of the body 210 of the control valve portion 201 in a constitution such that its end portion at a first pressure sensing portion 245 side is positioned at a solenoid portion 202 side, and that the second partition portion 212 intervenes between the first valve body 242 and the second valve body 243.

Note that the valve body 240 is, for example, assembled by making an outer circumferential surface of the end portion of the fuselage component 241 fit into and connect to a fit bore provided on an end portion of the first valve portion 242, and is arranged into the above constitution.

Materials of the valve body 240 are, for example, metal such as brass, copper, aluminum and stainless steel, or synthetic resin material, etc.

In the valve body 240, the first valve body 242 is arranged inside the first valve chamber 222. A first valve portion surface 242A is formed on the first valve body 242, which is a tapered surface reduced in diameter toward the fuselage component 241, i.e. reduced in diameter toward the second partition portion 212 of the body 210. The first valve portion surface 242A is joined to the first valve seating surface 212B to close the valve when the valve body 240 moves to opposite side of the solenoid portion 202 to move the tapered surface into the valve bore surface 212A. Also, when the valve body 240 moves close to the solenoid portion 202 to move the tapered surface away from the first valve seating surface 212B, the valve is opened.

Thus, the first valve portion surface 242A and the first valve seating surface 212B are formed into the first poppet valve 203 where cylindrical surfaces are not fitted. In the poppet valve, the valve portion surface is contacted with (seated on) the valve seating surface with minimal width, so that it is possible not to involve sliding friction when opening and closing the valve.

Note that a cross-sectional surface (seating area) of an inner diameter portion where the first valve portion surface 242A and the first valve seating surface 212B are joined (seated) is a first pressure receiving area S1 for receiving pressure of working fluid.

The fuselage component 241 of the valve body 240 is arranged to freely fit to an inside of the valve bore surface 212A of the second partition portion 212 of the body 210. When the first valve portion surface 242A is away from the first valve seating surface 212B to open the first poppet valve 203, a first flow passage 225 is formed between the fuselage component 241 of the valve body 240 and the valve bore surface 212A. Consequently, when the first poppet valve 203 is opened, fluid with supply pressure Po flows from the first valve chamber 222 in the first flow passage 225 and is supplied into the second valve chamber 223.

Thus, the fuselage component 241 of the valve body 240 is arranged to freely fit to the inside of the valve bore surface 212A of the second partition portion 212 of the body 210. In other words, void is secured between the fuselage component 241 and the valve bore surface 212A and there is no contact therebetween even when the valve body 240 moves. Consequently, even when there is something adhered onto the fuselage component 241, no failure in actuation of the solenoid valve 200 can be caused because the fuselage component 241 and the valve bore surface 212A do not slide.

In the valve body 240, the second valve body 243 is arranged inside the second valve chamber 223. The second valve body 243 is formed on an end portion opposite to the solenoid portion 202 of the valve body 240. On the second valve body 243, a second valve portion surface 243A is formed, which is a tapered surface reduced in diameter toward an anterior end, i.e. reduced in diameter toward the after-mentioned valve seating body 250. The second valve portion surface 243A is joined to a second valve seating surface 252B, which is a circular-shaped inner circumference corner of an opening portion of a cylindrically-shaped valve bore surface 252A which is an inner circumferential surface of a cylindrically-shaped valve seat 252 having a bottom formed on an end portion at a valve body 240 side of the valve seating body 250, to close the valve when the valve seating body 250 moves toward the valve body 240 and the tapered surface of the second valve body 243 is positioned in the valve bore surface 252A. Also, when the valve seating body 250 moves away from the valve body 240 and the tapered surface is away from the second valve seating surface 252B, the valve is opened.

Thus, the second valve portion surface 243A and the second valve seating surface 252B are formed into a second poppet valve 204 where cylindrical surfaces are not fitted. In the second poppet valve 204 as with the first poppet valve 203, the valve portion surface is contacted with (seated on) the valve seating surface with minimal width, so that sliding friction is not involved when opening and closing the valve.

Note that a cross-sectional surface (seating area) of an inner diameter portion where the second valve portion surface 243A and the second valve seating surface 252B are joined (seated) is a second pressure receiving area S2 for receiving pressure of working fluid.

Also, a first communication passage 246 is formed inside the valve body 240, which penetrates from the first pressure sensing portion 245 to the second valve body 243. The solenoid rod 286 penetrates from the solenoid portion 202 to the first communication passage 246, and its end portion is connected to an end portion at a solenoid portion 202 side of the valve seating body 250. Specifically, an end portion of the solenoid rod 286 is connected to the center of the bottom of the cylindrically-shaped valve seat 252 having a bottom of the valve seating body 250.

In the valve body 240, the first pressure sensing portion 245 is formed at a solenoid portion 202 side of the first valve body 242. The first pressure sensing portion 245 penetrates from an end portion at the solenoid portion 202 side of the first valve body 242 into the first partition portion 211, and is extended to the first pressure-sensing chamber 221, and the above-mentioned first communication passage 246 is formed therein. Also, an end portion at a solenoid portion 202 side of the first pressure sensing portion 245 is formed into flange shape, and an end-portion opening of the first communication passage 246 is formed in the center of a flange-shaped end face.

Also, one of end portions of a first spring 261 is arranged in a peripheral part of the flange shaped end face of the first pressure sensing portion 245. The other end portion of the first spring 261 is connected to an end face at a solenoid portion 202 side of the first pressure-sensing chamber 221. The first spring 261 elastically presses the valve body 240 in a direction opposite to the solenoid portion 202 by spring force F1.

Fluid flowing into the first pressure-sensing chamber 221 acts on each member in the solenoid portion 202 communicated therewith to achieve a balance in pressures so as to avoid the pressure of the fluid from acting only on one face (fluid also flows into the solenoid portion 202 from the first pressure-sensing chamber 221).

The first pressure-sensing chamber 221 communicates with the second valve chamber 223 via the first communication passage 246 when the second valve portion surface 243A of the second valve body 243 of the valve body 240 is away from the second valve seating surface 252B of the valve seating body 250 to open the second poppet valve 204. Also, when the second valve portion surface 243A of the valve body 240 is in close contact with the second valve seating surface 252B of the valve seating body 250 to close the second poppet valve 204, the first pressure-sensing chamber 221 communicates with the second pressure-sensing chamber 224 via the first communication passage 246.

Note that an area where the first pressure sensing portion 245 receives supply pressure Po is a third pressure receiving area S3.

The valve seating body 250 is movably set up in axial direction at an opposite side to the solenoid portion 202 inside the body 210.

In the valve seating body 250 (corresponding to the second valve member in claims), the cylindrical valve seat 252 is formed on an end portion at a valve body 240 side of the circular cylindrical shaped fuselage component 251, and also, the end portion of the solenoid rod 286 is connected to the end portion at the valve body 240 side (solenoid portion 202 side) thereof. Also, an end portion at an opposite side to the solenoid portion 202 of the valve seating body 250 is formed into a cylindrical shape with a bottom which opens to the side of the relevant end portion, forming the second pressure sensing portion 255. A second spring 262 is arranged inside the cylindrically-shaped second pressure sensing portion 255. The second spring 262 is an extension spring biasing the solenoid rod 286 toward the right in the figure, i.e. toward the solenoid portion 202.

Note that spring force of the second spring 262 is larger than spring force of the above-mentioned first spring 261, and the valve seating body 250 and the valve body 240 are pushed toward the solenoid portion 202 by the spring force of the second spring 262 against the spring force of the first spring 261 when any magnetic force (F) is not acted by the solenoid portion 202.

Note that a pressure receiving area of the second pressure sensing portion 255 is a fourth pressure receiving area S4.

The second valve seating surface 252B provided at an inner circumference corner of an end portion at a valve body 240 side of the valve seat 252 of the valve seating body 250 forms an open and closed valve by joining to and separating from the second valve portion surface 243A of the second valve body 243 of the valve body 240. As mentioned above, the second valve seating surface 252B and the second valve portion surface 243A constitute the second poppet valve 204 which is opened and closed by joining these surfaces with a small joining width. Also, an area for receiving fluid with control pressure Pc in the cross-sectional surface of the inner diameter portion where the second valve seating surface 252B and the second valve portion surface 243A are joined is the second pressure receiving area S2.

In the present embodiment, the above-mentioned first pressure receiving area (seating area of the first poppet valve 203) S1, second pressure receiving area (seating area of the second poppet valve 204) S2, third pressure receiving area (pressure receiving area of the first pressure sensing portion 245) S3 and fourth pressure receiving area (pressure receiving area of the second pressure sensing portion 255) S4 are all formed approximately equally.

Also, the second communication passage 256 for communicating between the bottom of the circular cylindrical valve seat 252 and the second pressure-sensing chamber 224 is formed on the valve seating body 250. The second communication passage 256 allows introducing fluid in the second valve chamber 223 to the second pressure-sensing chamber 224 where the second spring 262 is arranged when the second poppet valve 204 is opened. Simultaneously, the second communication passage 256 always communicates between the second pressure-sensing chamber 224, the first communication passage 246, and the first pressure-sensing chamber 221 and the discharging port 231.

Note that an end-portion opening at a valve body 240 side of the second communication passage 256 is formed in the center of the bottom of the cylindrically-shaped valve seat 252 having a bottom of the valve seating body 250, where the solenoid rod 286 is connected to as mentioned above. However, a part of the opening portion of the second communication passage 256 is, as shown in FIG. 2, increased in diameter further to the outer circumference portion than the outer diameter of the solenoid rod 286, or formed with a groove extending to such position, so that the opening is not blocked by the solenoid rod 286 to secure flow passage for maintaining sufficient flow amount of fluid between the second valve chamber 223 and the second communication passage 256.

In the valve seating body 250 having such constitution, the valve seating body 250 is moved toward the valve body 240 by spring force F2 of the second spring 262 when the solenoid portion 202 does not actuate. When the valve seating body 250 is moved, the valve seating body 250 closes the valve with respect to the valve body 240, and simultaneously moves the valve body 240 toward the right in the figure, which separates the first valve portion surface 242A from the first valve seating surface 212B to open the first poppet valve 203. At this time, the first spring 261 is compressed.

Since the structure of the solenoid portion 202 is the same as the structure of the solenoid portion 102, the explanation thereof is left out.

Next, movements of the solenoid valve 200 having such constitution will be explained.

When no electric current is applied to the solenoid portion 202, magnetic force F of the solenoid portion 202 does not act; the valve seating body 250 moves toward the valve body 240 due to extension force of spring force F2 of the second spring 262; and the second valve seating surface 252B of the valve seating body 250 is joined to the second valve portion surface 243A of the second valve body 243 to close the second poppet valve 204 in which stroke (opening amount) is zero. As a result, flow of fluid is blocked between the second valve chamber 223 and the second communication passage 256, fluid with control pressure Pc flowing in the output port 233 is not allowed to flow out toward the discharging port 231.

Also, since spring force of the second spring 262 is larger than spring force of the first spring 261, the second spring 262 further compresses the first spring 261 of the first pressure-sensing chamber 221 and moves the valve body 240 toward the solenoid portion 202, so that the first valve portion surface 242A and the first valve seating surface 212B are separated to open the first poppet valve 203 in which stroke (opening amount) is maximum. As a result, fluid with supply pressure Po supplied from the supply port 232 flows through the first flow passage 225 between the first valve seating surface 212B and the first valve portion surface 242A into the second valve chamber 223. It results in increasing flow amount of fluid with control pressure Pc at an output port 233 side (for example, of hydraulic brake).

Namely, when electric current does not flow to the solenoid portion 202 control pressure Pc can be increased.

When electric current is applied to the solenoid portion 202 in this situation, magnetic force F acts on between the movable shaft 181 and the fixed shaft 182 of the solenoid portion 202. When combined force of the magnetic force F and the spring force of the first spring 261 becomes larger than the spring force of the second spring 262, the valve seating body 250 moves to a direction away from the solenoid portion 202 against the spring force of the second spring 262. At this time, since the first spring 261 acts on the valve body 240, the valve body 240 integrally moves to the direction away from the solenoid portion 202 together with the valve seating body 250, and the second poppet valve 204 is kept closed.

On the other hand, as the second poppet valve 204 moves to the direction away from the solenoid portion 202, the first valve portion surface 242A of the first valve body 242 forming the first poppet valve 203 is made closer to the first valve seating surface 212B to decrease the stroke (opening amount) of the first poppet valve 203.

Note that magnetic force F, positions after moving of the valve body 240 and valve seating body 250, and the stroke (opening amount) of the first poppet valve 203 at this time can be determined by the amount of current applied to the solenoid portion 202 as in the first embodiment.

When the amount of current applied to the solenoid portion 102 reaches a certain level, the first valve portion surface 242A of the valve body 240 is moved to the position for joining to the first valve seating surface 212B, and the stroke (opening amount) of the first poppet valve 203 becomes zero to close the valve. In this situation, flow of fluid is blocked from the first valve chamber 222 to the second valve chamber 223, and flow of fluid with control pressure Pc from the supply port 232 to the output port 233 is stopped.

Note that the second poppet valve 204 is still closed in which the stroke (opening amount) is zero right after the first poppet valve 203 is closed, where the first poppet valve 203 and the second poppet valve 204 are both closed.

When controlled intermediate electric current is applied to the solenoid portion 202 in this situation, the valve seating body 250 and the valve body 240 move depending on electric current flowing to the solenoid portion 202 to open and close the first poppet valve 203 in the operating condition that the second poppet valve 204 is closed. Thus-controlled opening and closing of the first poppet valve 203 allow proportional flow control of fluid with supply pressure Po flowing from the first valve chamber 222 to the second valve chamber 223.

When the amount of current applied to the solenoid portion 202 is increased further than the above condition, the valve body 240 cannot move toward the valve seating body 250 because the first valve body 242 is already hooked by the second partition portion 212 and the valve seating body 250 directly connected to the solenoid rod 286 further moves to the direction opposite to the solenoid portion 202. As a result, the second valve seating surface 252B of the valve seating body 250 constituting the second poppet valve 204 is separated from the second valve portion surface 243A of the valve body 240 to open the second poppet valve 204. As a result, fluid with control pressure Pc in the second valve chamber 223 is discharged through the second communication passage 256 and the second pressure-sensing chamber 224 into the discharging port 231, and control pressure Pc starts to reduce.

When maximum electric current is applied to the solenoid portion 202, magnetic force F of the solenoid portion 202 is the largest, and the solenoid rod 286 moves the valve seating body 250 to an end portion at a distant side of the solenoid portion 202. As a result, the second valve seating surface 252B of the valve seat 252 is separated from the second valve portion surface 243A of the second valve body 243 to open the second poppet valve 204 in which stroke (opening amount) is maximum, and for example, fluid with control pressure Pc for a hydraulic brake of an automatic transmission and the like can be discharged into the discharging port 231 from the second valve chamber 223 through the first communication passage 246 and the second pressure-sensing chamber 224.

At this time, the valve body 240 is pressed to a valve seating body 250 direction by spring force F1 of the first spring 261, and the first valve portion surface 242A is joined to the first valve seating surface 212B to close the first poppet valve 203 consisting of the first valve portion surface 242A and the first valve seating surface 212B. Therefore, fluid with supply pressure Po supplied from the supply port 232 is blocked by the first poppet valve 203 to stop flowing into the second valve chamber 223.

Namely, when sufficient electric current flows to the solenoid portion 202, control pressure Pc can be reduced.

Thus, in the solenoid valve 200 of the present embodiment, the solenoid rod 286 of the solenoid portion 202 is actuated depending on magnitude of electric current, the opening/closing degrees (opening amounts) of the first poppet valve 203 and the second poppet valve 204 are controlled in cooperation with the spring forces F1 and F2 of the first and second springs 261 and 262, and fluid with control pressure Pc is flowed depending on the opening/closing degrees of the valves for controlling flow amount. At this time, the constitution for actuating the first poppet valve 203 and second poppet valve 204 of the solenoid valve 200 satisfies the relation of S1=S2=S3=S4, so that no unbalanced force acts on the first poppet valve 203 and the second poppet valve 204 by fluid pressure. Therefore, the solenoid rod 286 is moved as set up only by magnetic force F of the solenoid portion 202 to control the opening/closing degrees of the first poppet valve 203 and the second poppet valve 204.

Also, the solenoid valve 200, as with the solenoid valve 100, is constituted so as to form no slide member between the fuselage component 241 of the valve body 240 and the valve bore surface 212A of the second partition portion 212, and also, valve surfaces of the first poppet valve 203 and the second poppet valve 204 are contacted with narrow width in line contact. Consequently, in the first poppet valve 203 and the second poppet valve 204, frictional resistance can be reduced, and it is possible to reduce the possibility that any attachment is adhered between the sliding surfaces to increase sliding friction because sliding surfaces are small.

Also, by constituting the valve portion with the poppet valve, the amount of leakage can be reduced in each valve, resulting in reducing inside leakage in the valve as a whole.

Also, the valve body slides with minimal clearance without using bellows in the solenoid valve 200. Consequently, it is possible to prevent from causing a slope when the valve is seated due to the slope of the bellows, so that the valve can be properly opened and closed.

Also, compared to a solenoid valve with using bellows, a solenoid valve resistible to high pressure can be constituted. In other words, as the solenoid valve is kept small in size, the flow amount can be secured.

Also, it is possible to reduce component cost, and to downsize the device.

Third Embodiment

The third embodiment of the present invention will be explained in reference to FIG. 3.

The solenoid valve of the present embodiment is an example of components for achieving the normal close-type solenoid valve according to the present invention shown schematically in FIG. 1.

Figure 3:
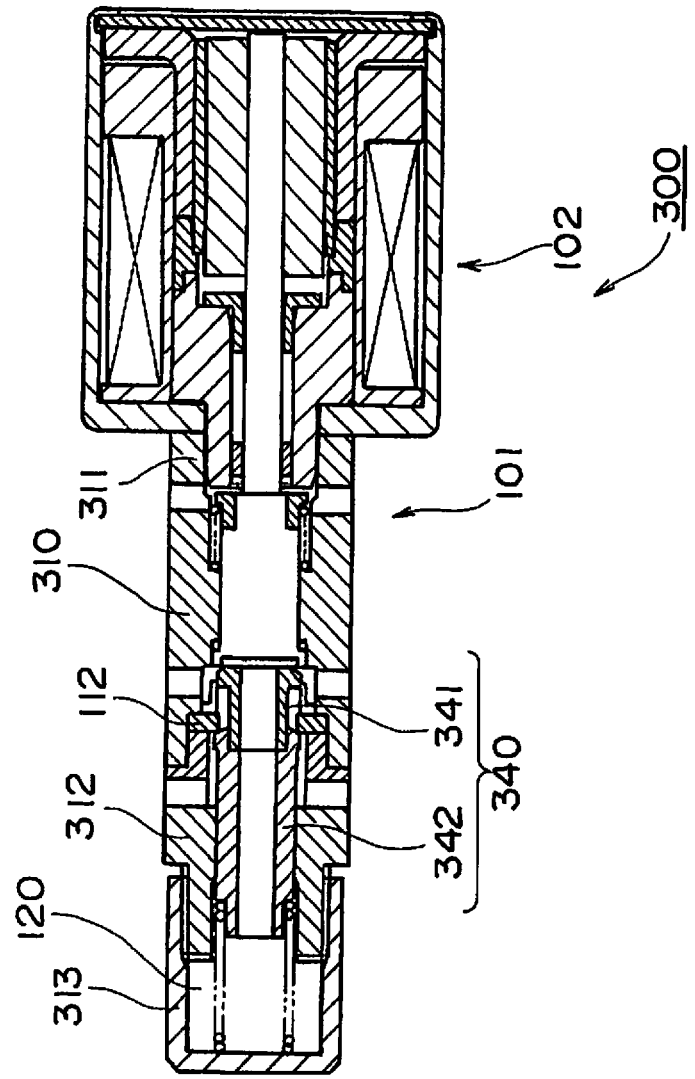
FIG. 3 is a figure showing constitution of a solenoid valve of a third embodiment of the present invention.

Consequently, a solenoid valve 300 of the third embodiment shown in FIG. 3 basically has the same structure of the solenoid valve 100 of the first embodiment, so that the same symbols are assigned to the substantially same components, and explanation thereof is left out.

In the solenoid valve 300 of the present embodiment, a body 310 is, for the reason of assembling, divided into a first body portion 311, a second body portion 312 and a third body portion 313 in the order from the solenoid portion 102 side, in which the respective end portions are provided with screw portions. The body 310 is integrally assembled by screwing the corresponding screw portions.

Also, for the second partition portion 112 dividing the valve space chamber 120 in the solenoid valve 300 of the present embodiment, a dividing member 112 is sandwiched between the first body portion 311 and the second body portion 312, and fixed when a male screw of the second body portion 312 is screwed in a female screw of the first body portion 311 to link mutually.

Also, a valve body 340 is constituted as a combined part of a first valve portion 341 and a second valve portion 342 in the solenoid valve 300.

The other components of the solenoid valve 300 are substantially the same as in the solenoid valve 100 of the first embodiment. Also, movements, functions and effects of the solenoid valve 300 are the same as in the solenoid valve 100 of the first embodiment.

The solenoid valve according to the present invention can properly be achieved by having such a constitution.

Fourth Embodiment

The fourth embodiment of the present invention will be explained in reference to FIG. 4.

The solenoid valve of the present embodiment is an example of components for achieving the normal open-type solenoid valve according to the present invention as shown schematically in FIG. 2.

Figure 4:
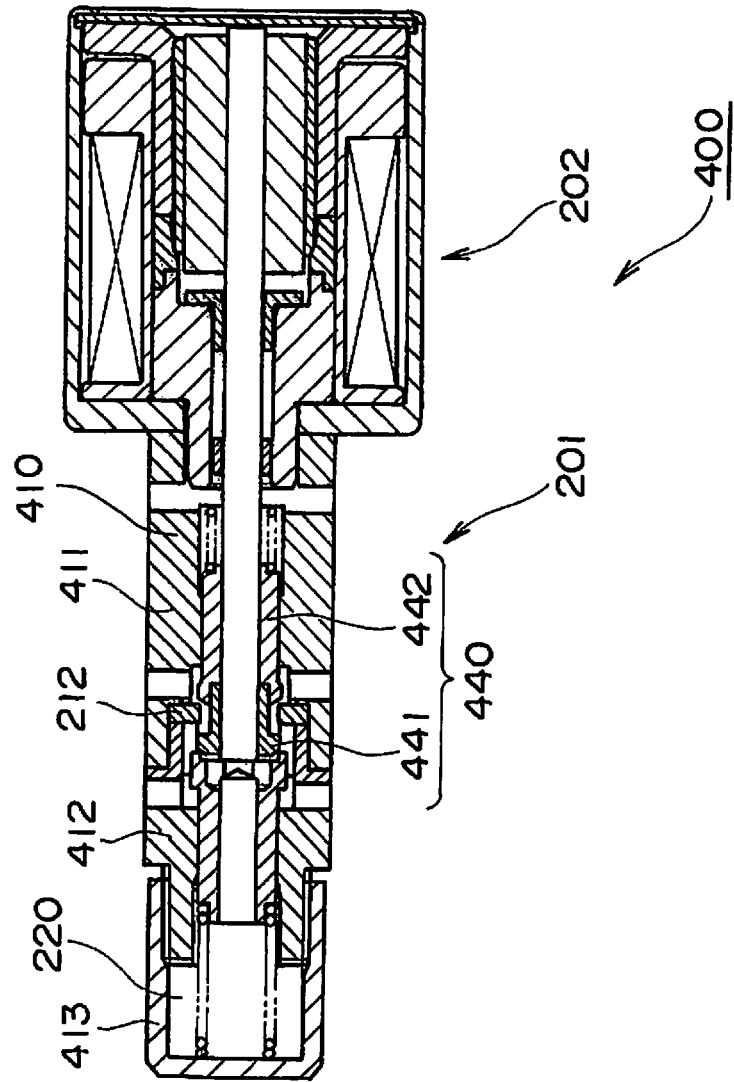
FIG. 4 is figure showing constitution of a solenoid valve of a fourth embodiment of the present invention.

Consequently, a solenoid valve 400 of the fourth embodiment shown in FIG. 4 basically has the same structure of the solenoid valve 200 of the second embodiment, so that the same symbols are assigned to the substantially same components, and explanation thereof is left out.

In the solenoid valve 400 of the present embodiment, a body 410 is, for the reason of assembling, divided into a first body portion 411, a second body portion 412 and a third body portion 413 in the order from the solenoid portion 202 side, in which the respective end portions are provided with screw portions. The body 410 is integrally assembled by screwing the corresponding screw portions.

Also, for the second partition portion 212 dividing the valve space chamber 220 in the solenoid valve 400 of the present embodiment, a dividing member 212 is sandwiched between the first body portion 411 and the second body portion 412, and fixed when a male screw of the second body portion 412 is screwed in a female screw of the first body portion 411 to link mutually.

Also, a valve body 440 is constituted as a combined part of a first valve portion 441 and a second valve portion 442 in the solenoid valve 400.

The other components of the solenoid valve 400 are substantially the same as in the solenoid valve 200 of the second embodiment. Also, movements, functions and effects of the solenoid valve 400 are the same as in the solenoid valve 200 of the second embodiment.

The solenoid valve according to the present invention can properly be achieved by having such a constitution.

Fifth Embodiment

The fifth embodiment of the present invention will be explained in reference to FIG. 5.

The solenoid valve of the present embodiment is an example of other components for achieving the normal close-type solenoid valve according to the present invention shown schematically in FIG. 1.

Figure 5:
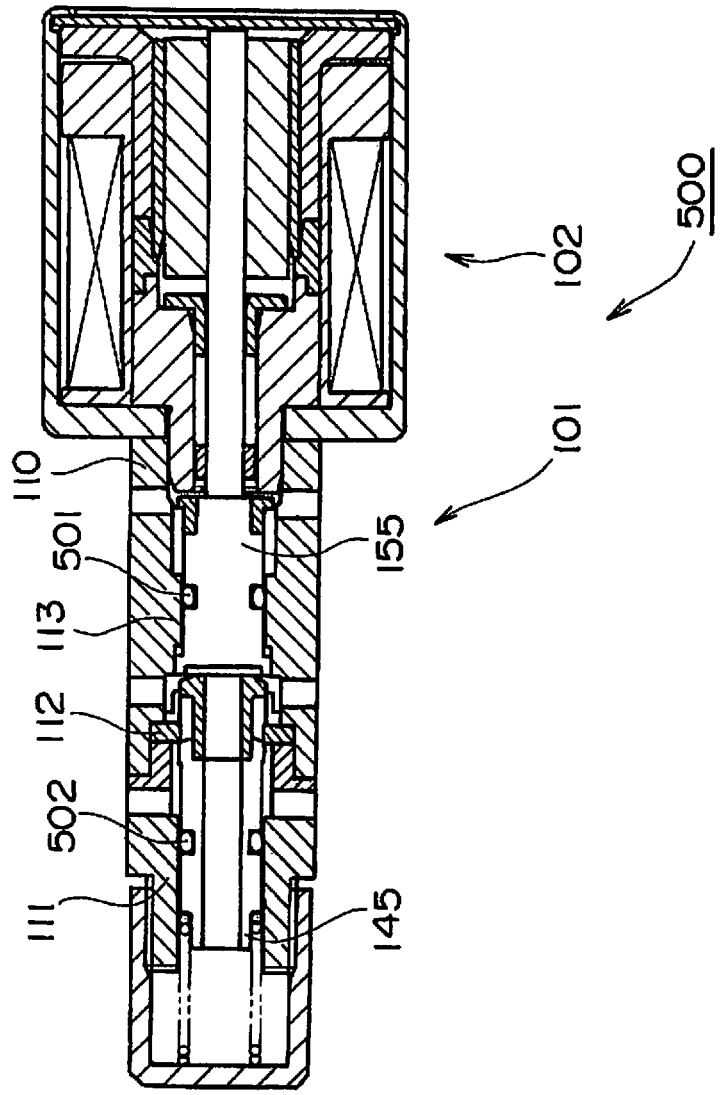
FIG. 5 is a figure showing constitution of a solenoid valve of a fifth embodiment of the present invention.

Consequently, a solenoid valve 500 of the fifth embodiment shown in FIG. 5 basically has the same structure as in the solenoid valve 100 of the first embodiment and the solenoid valve 300 of the third embodiment, so that the same symbols are assigned to the substantially same components, and explanation thereof is left out.

The solenoid valve 500 of the present embodiment has an O ring as a seal member, which is fixedly set up to a slide member, in addition to the components of the solenoid valve 300 shown in FIG. 3. Namely, an O ring 502 is fixedly set up to an outer circumferential surface which slides with respect to the first partition portion 111 of the first pressure sensing portion 145 of the valve body 140, and an O ring 501 is fixedly set up to an outer circumferential surface which slides with the third partition portion 113 of the second pressure sensing portion 155 of the valve seating body 150.

It is possible to reduce leakage from the slide member by having such a constitution.

The solenoid valve according to the present invention can be achieved by having such a constitution.

Note that the O ring may be provided at a first partition portion 111 side and a third partition portion 113 side, i.e. at a body 110 side. Also, any other seal member except for O ring may be used.

Sixth Embodiment

The sixth embodiment of the present invention will be explained in reference to FIG. 6.

The solenoid valve of the present embodiment is an example of other components for achieving the normal open-type solenoid valve according to the present invention shown schematically in FIG. 2.

Figure 6:
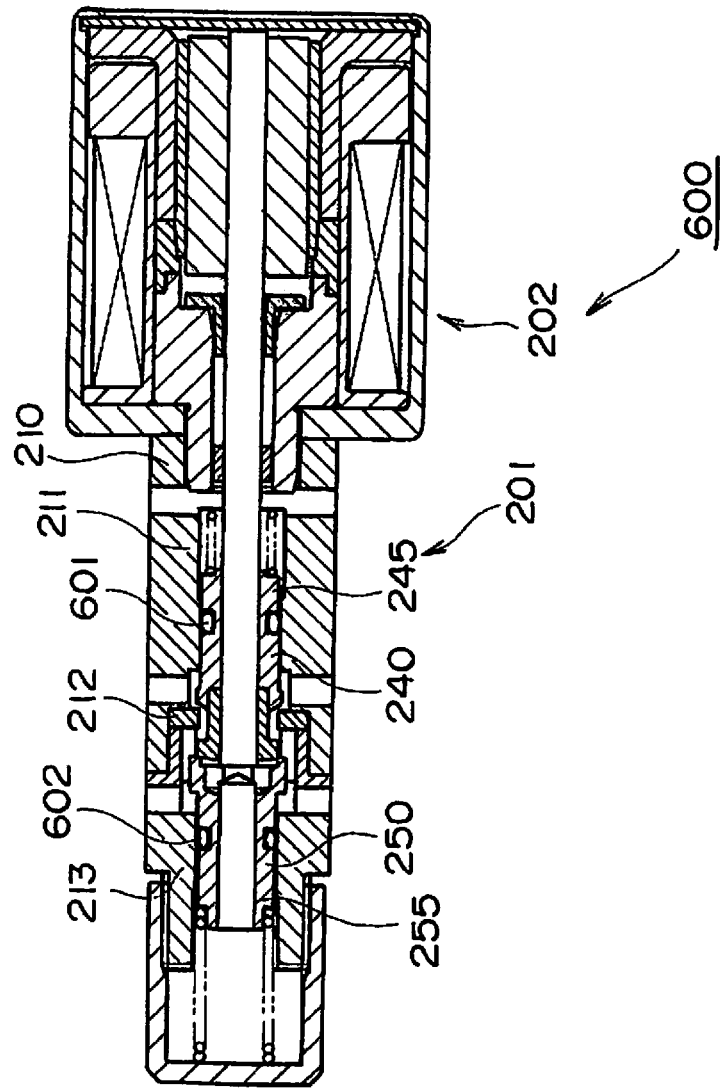
FIG. 6 is a figure showing constitution of a solenoid valve of a sixth embodiment of the present invention.

Consequently, a solenoid valve 600 of the sixth embodiment shown in FIG. 6 basically has the same structure as in the solenoid valve 200 of the second embodiment and the solenoid valve 400 of the fourth embodiment, so that the same symbols are assigned to the substantially same components, and explanation thereof is left out.

The solenoid valve 600 of the present embodiment has an O ring as a seal member, which is fixedly set up to a slide member, in addition to the components of the solenoid valve 400 shown in FIG. 4. Namely, an O ring 601 is fixedly set up to an outer circumferential surface which slides with respect to the first partition portion 211 of the first pressure sensing portion 245 of the valve body 240, and an O ring 602 is fixedly set up to an outer circumferential surface which slides with the third partition portion 213 of the second pressure sensing portion 255 of the valve seating body 250.

It is possible to reduce leakage from the slide member by having such a constitution.

The solenoid valve according to the present invention can be achieved by having such a constitution.

Note that the O ring may be provided at a first partition portion 211 side and a third partition portion 213 side, i.e. at a body 210 side. Also, any other seal member except for O ring may be used.

FIELD OF INDUSTRIAL APPLICATION

The present invention is useful as a control valve able to accurately control flow amount of fluid supplied to vehicle hydraulic system, hydraulic/pneumatic system of a variety of power-transmitting devices and the like. Also, it is useful as an inexpensive control valve and further useful as a control valve without malfunction as well.

The invention claimed is:

1. A solenoid valve for controlling flow amount of fluid, comprising:
a body inside of which is formed into a valve space chamber penetrating in an axial direction, the valve space chamber being divided in sequence into a first pressure-sensing chamber, a first valve chamber, a second valve chamber and a second pressure-sensing chamber by a first partition portion, a second partition portion and a third partition portion;
a supply port penetrating said first valve chamber and flowing fluid in and out;
an output port penetrating said second valve chamber and flowing fluid in and out;
a discharging port penetrating one or both of said first pressure-sensing chamber and said second pressure-sensing chamber respectively and flowing fluid in and out;
a first valve member movably arranged in the axial direction inside said first pressure-sensing chamber, said first valve chamber and said second valve chamber, the first valve member having a first communication passage therein for penetrating the first valve member in the axial direction and communicating a first pressure-sensing chamber side and a second valve chamber side;
a second valve member movably arranged in the axial direction inside said second valve chamber and said second pressure-sensing chamber, the second valve member having a second communication passage therein for penetrating the second valve member in the axial direction and communicating a second valve chamber side and a second pressure-sensing chamber side;
a first poppet valve having any one of a valve body and a valve seating body formed on said second partition portion dividing said first valve chamber and said second valve chamber, and the other one of the valve body and valve seating body formed on said first valve member, the first poppet valve being opened and closed between said first valve chamber and said second valve chamber;
a second poppet valve having any one of a valve body and a valve seating body formed on an end portion at a second valve chamber side of said first valve member, and the other one of the valve body and valve seating body formed on an end portion at a second valve chamber side of said second valve member, the second poppet valve for communicating said first communication passage and said second communication passage with said second valve chamber when opening the valve and communicating said first communication passage with said second communication passage when closing the valve;

a first pressure sensing portion integrally formed with said first valve member, and slidably arranged on an inner circumference of said first partition portion dividing said first pressure-sensing chamber and said first valve chamber;

a second pressure sensing portion integrally formed with said second valve member, and slidably arranged on an inner circumference of said third partition portion dividing said second valve chamber and said second pressure-sensing chamber;

a solenoid portion generating magnetic force in predetermined direction depending on applied electric current and making the magnetic force act on said second valve member via a solenoid rod connected to said second valve member;

a first spring making elastic force in second valve member direction act on said first valve member; and a second spring making elastic force in opposite direction to the magnetic force, acted by said solenoid portion, act on the second valve member;

wherein a first pressure receiving area which is a seating area of said first poppet valve, a second pressure receiving area which is a seating area of said second poppet valve, a third pressure receiving area which is a pressure receiving area of said first pressure sensing portion and a fourth pressure receiving area which is a pressure receiving area of said second pressure sensing portion are approximately equally made.

2. The solenoid valve as set forth in claim 1, wherein in at least any one of said first partition portion and said third partition portion, a seal member is fixedly set up on any one or both of an inner circumference of the first or third partition portion and an outer circumference of said first pressure sensing portion or said second pressure sensing portion which slides with the inner circumference.

* * * * *